United States Patent Office 2,917,870
Patented Dec. 22, 1959

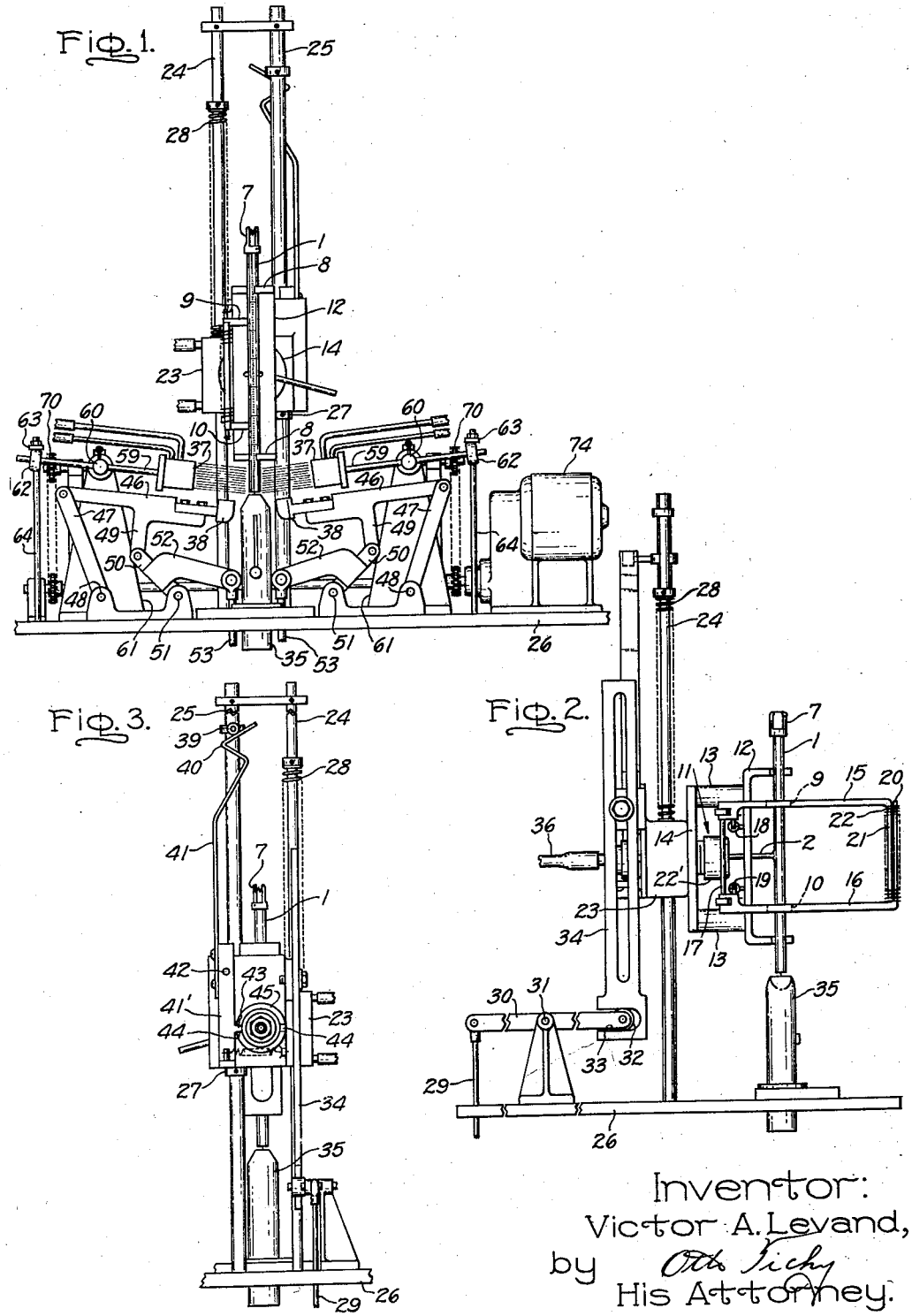

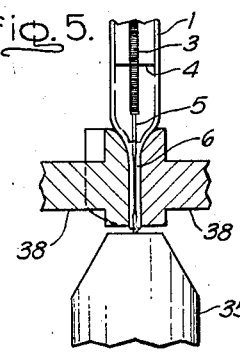
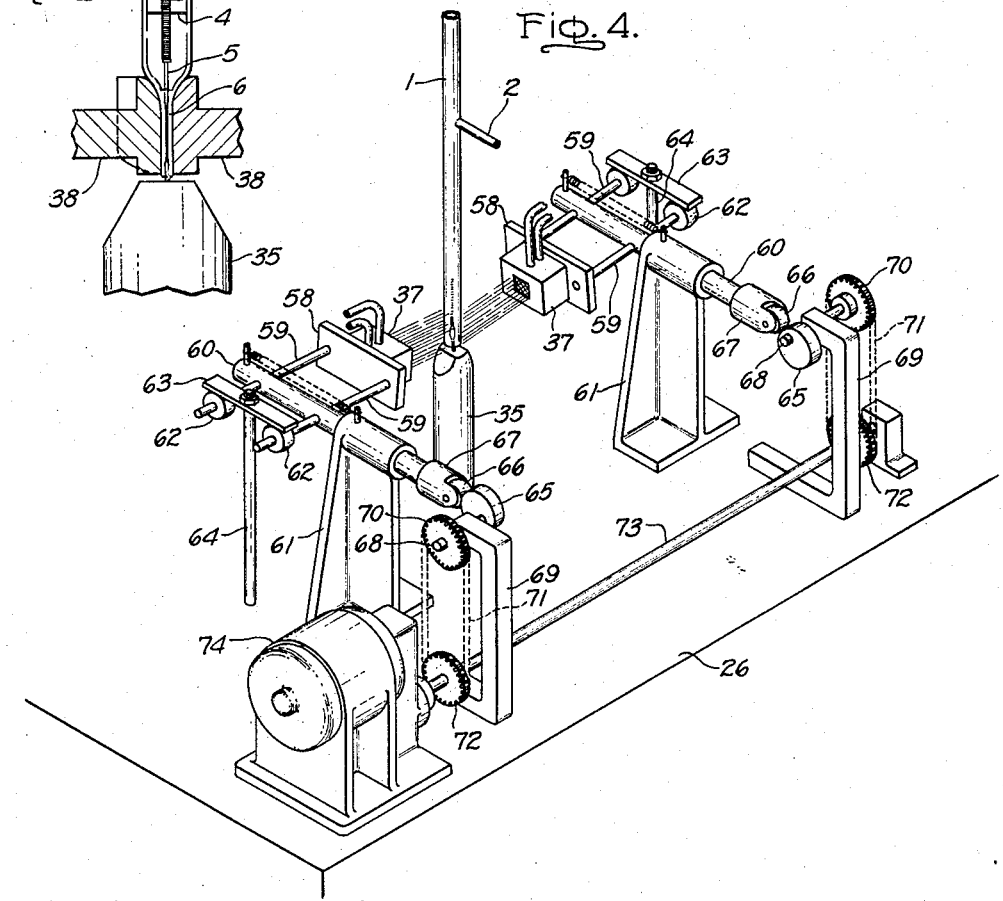
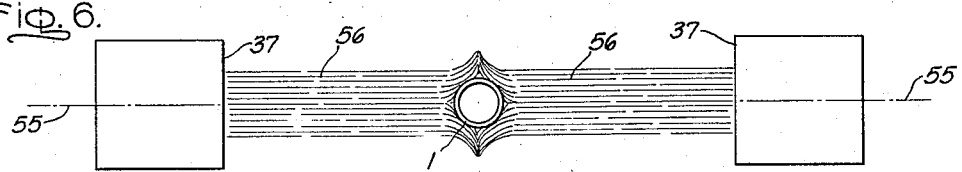
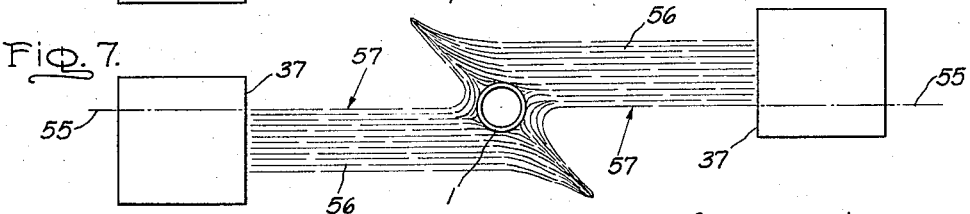
Inventor:
Victor A. Levand,
by Otto Vichy
His Attorney.

---

2,917,870

PINCH SEAL APPARATUS

Victor A. Levand, Lyndhurst, Ohio, assignor to General Electric Company, a corporation of New York Application May 28, 1957, Serial No. 662,075

7 Claims. (Cl. 49—2)

My invention relates generally to apparatus for sealing tubes of vitreous material, particularly quartz, and more particularly to apparatus for forming a pinch seal wherein a portion of the tube is heated to a plastic condition and then pinched or compressed between opposed jaws. Still more particularly, my invention relates to an improved burner construction for effectively heating the tube preparatory to pinching.

In the manufacture of electric lamps, for example, it has been the practice to form pinch seals at the ends of a tubular quartz envelope about lead-in conductors extending through the said ends, by employing a pair of burners arranged on opposite sides of the tube to direct flames toward the tube to heat it to a plastic condition, and a pair of pinch jaws arranged to close upon the tube to form the seal. Such an arrangement requires critical alignment and adjustment of the burners for quartz tubing of varying wall thicknesses, and the use of different selected burners for tubing of relatively small differences in diameter.

It is an object of my invention to provide an improved apparatus which will obviate the above-mentioned disadvantages and which will heat tubing of varying dimensions in a manner to insure pinch seals of good quality. It is a further object to secure the improved results by virtue of a relatively simple modification in structure and operation of conventional apparatus.

The above objects, and other objects which will become apparent in the following description, are achieved by an arrangement wherein a pair of opposed burners, arranged to direct flames toward the tube, are oscillated in parallel paths normal to a plane through the axis of the tube (i.e., normal to the direction of the flames) and in mutually opposite directions in their respective paths. The effect is to apply more heat to the sides of the tubing where the mass is greater, thus distributing the heat more uniformly and eliminating the critical adjustment of fires, location of burners and positioning of the tubing, and without the complications of rotating the tubing or the burners.

Further features and advantages of my invention will appear from the following detailed description of a species thereof and from the drawings wherein:

Figs. 1 and 2 are front and side elevations of a pinch sealing apparatus embodying the invention;

Fig. 3 is a fragmentary rear elevation of the apparatus;

Fig. 4 is a fragmentary perspective view showing supporting and actuating mechanism for the burners;

Fig. 5 is a fragmentary sectional elevation showing the pinch jaws in their operative pinching position; and Figs. 6 and 7 are fragmentary plan views showing the relationship of the burner flames and the tubing.

The apparatus illustrated herein, except for the supporting and operating mechanism for the burners, is like that shown and claimed in application Serial No. 585,519, filed May 17, 1956, now Patent Number 2,855,265, issued Oct. 7, 1958, by A. G. Foote and V. A. Levand, and assigned to the assignee of the present application. The apparatus is adapted to seal a lamp assembly comprising a tubular quartz envelope 1 having a quartz gas supply tube 2 extending laterally from the midportion thereof. The tube 1 contains a filament assembly consisting of a coiled tungsten filament 3 (Fig. 5) provided with a plurality of spaced supporting discs 4 and having attached to each end thereof a molybdenum lead-in wire 5 having a flattened intermediate portion 6. The filament assembly is temporarily supported by a clamping plug or cap member 7 which grips the upper lead-in wire and closes the upper end of the tube 1.

The lamp assembly is supported in a holder means including notched jaws 8 at one side of the tube and jaws 9 and 10 at the other side of the tube, and a rotatable chuck 11 (Fig. 2) in which the supply tube 2 is received. The jaws 8 are carried by a U-shaped arm or bracket 12 which is secured by studs 13 to extensions of a flanged portion 14 of the chuck 11 so as to be rotatable therewith. The jaws 9 and 10 are mounted on arms 15 and 16, respectively, which are independently pivoted on a pin 17 mounted in extensions of the bracket 12 and are biased to closed position by springs 18 and 19 connected between pins on said arms 15, 16 and on said bracket 12. The movable arms 15, 16 have coextending end portions 20 and 21 which are loosely coupled by a coil spring 22 to form a handle portion by which the operator holds the arms 15, 16 in open position during insertion of the lamp assembly into the chuck 11 and jaws 8, the supply tube 2 being inserted through a slot in bracket 12 into a conventional port member including a rubber ring (not shown) compressed by a screw cap 22' on the chuck.

The chuck 11 is mounted to rotate in a block 23 which is slidably mounted on columns 24 and 25 extending vertically upward from a bed or table 26. The block 23 is normally urged downward toward a stop collar 27 on column 25 by a spring 28 on column 24.

At the time the lamp assembly is mounted in the apparatus, the block 23, together with associated chuck 11 and jaws 8, 9, 10, is in a raised position from that shown in Figs. 1 to 3, having been elevated by operation of a connecting rod 29 which is connected to one end of a lever 30 (Fig. 2) which is pivoted at 31 and is connected through a roller 32 to a slot 33 in a link 34 secured to block 23. The assembly of block 23 and associated chuck and jaws is then lowered and the operator grasps the lower lead-in wire 5 (Fig. 5) and threads it into an aperture in the upper end of a chuck 35 in which it is held by a suitable clamp (not shown) within the chuck. A flow of inert gas is then introduced into the tube 1 by way of supply tube 2, chuck 11 and a flexible tube 36 connected to the chuck. The lower end of the tube 1 is then heated to a plastic condition by oxyhydrogen burners 37 and then compressed and sealed about the adjacent lead-in wire 5 by a pair of pinch jaws 38. After the formation of the seal, and with the supply of inert gas to tube 1 maintained, the assembly of block 23 and associated chuck and jaws is raised. In the course of this upward movement, the rotary chuck and lamp holder assembly is released for rotation by engagement of a roller 39 (Fig. 3) on column 25 with the cam portion 40 of an arm 41 extending upwardly from a latch 41'. The said latch 41' is pivoted on a pin 42 in block 23 and has a tooth 43 engageable with each of a pair of diametrically opposed notches 44 in a collar 45 which is fixed to the back of the rotary chuck 11. The cap 7 is removed from the upper end of the tube 1, and the assembly of chuck 11 and associated holder jaws is revolved through 180° by the operator, after which the assembly is lowered, the lead-in wire 5 is inserted in the chuck 35, and the heating and pinching operations are again carried out to complete the second seal, after which the supply tube 2 is fused and severed to retain the inert gas filling in the tube 1 as the final filling gas.

As shown in Fig. 1, the pinch jaws 38 are each carried by a cradle member 46 which is pivoted at its back end to one end of a link 47 which is pivoted at its other end on a pin 48 in a lug on table 26. The cradle also has a depending arm portion 49 which is connected to one end of the link 50 which is pivoted on a pin 51. To effect the pinching operation, the cradle 46 is rocked forwardly and upwardly by an arm 52 which is attached at one end to the link 50 and is pivotally connected at its other end to a rod 53 which may be pulled down by a foot pedal. The arrangement is such that the jaws 38 close upon the tube 1 in essentially a horizontal straight line motion.

In accordance with the present invention, during the heating of the tube 1 the opposed burners 37 are oscillated in mutually opposite directions through parallel paths extending normal to a vertical plane including the axis of the tube 1 and indicated by dot-dash lines 55 in Figs. 6 and 7. The burners are preferably proportioned to produce flames 56 having a width approximating, and preferably slightly larger than, the diameter of the tube 1, and are oscillated equal amounts to each side of the plane 55 through a total distance or range approximately equal to the width of the flames. Thus, at the limit of oscillation in one direction, as shown in Fig. 7, each of the flames is located at one side of the plane 55 with its proximate edge 57 substantially in that plane. The oscillating motion of the burners essentially produces the effects of rotating burners and the tube 1 is partially collapsed by the pressure of the flames preparatory to pinching by the jaws 38 which move toward the tube parallel to or within the plane 55 to compress the tube in the same direction as the flames. The oscillation of the burners 37 in mutually opposite directions is necessary to prevent movement of the heated portion of the tube; oscillation of directly opposed flames in the same direction causes the heated tube portion to oscillate at the same frequency and in the opposite direction to the movement of the flames due, presumably, to pressure exerted by the flames.

Referring to Fig. 4, each of the burners 37 is mounted on a backing plate 58 which is carried by support rods 59 extending through and fixed to a horizontal shaft 60 journalled in a bearing in bracket 61 on table 26. In the particular arrangement illustrated herein, the pinch jaws 38, or more properly the supporting cradles 46, move upward through the position occupied by the burners 37 and carry the burners upward therewith. The burners are each normally retained at correct elevation by engagement of rollers 62 on the ends of rod 59 with a horizontal plate 63 secured to the upper end of a post 64 extending upwardly from table 26. The burners 37 are thereby free to rotate with shafts 60 when engaged by the jaw support cradles 46.

The shafts 60 and burners 37 are reciprocated or oscillated by eccentric cams 65 engaging rollers 66 on cam follower caps 67 which are adjustably secured, as by set screws, to the ends of the shafts 60. Each cam 65 is driven by a shaft 68 which is supported by a bracket 69 on table 26 and which carries a sprocket 70 which is driven by a chain 71 from a sprocket 72 on shaft 73 which is driven by an electric motor and speed reducer 74.

The eccentric disc cams 65 are mounted 180° out of phase so as to reciprocate the shafts 60 in mutually opposite directions and at rates of speed approximating simple harmonic motion so that the flames 56 move more slowly across the side portions of the tube 1 than across the middle portion, thereby contributing to a more uniform heating of the tube inasmuch as the mass of glass at the sides is, of course, considerably greater than at the middle in sections between planes parallel to the plane 55 and spaced apart equal distances. For instance, the two side quarter sections contain about 62% of the mass as compared with about 38% in the middle half section.

In one particular case, I have obtained good results by employing burners having flames ½ inch wide to heat a quartz tube of ⅜ inch diameter, and the same burner has been used with good results in processing tubes of varying wall thickness and ranging in diameter from ¼ inch to ½ inch and which previously required the use of selected burners. The burners were operated at 64 oscillations or reciprocations per minute through a range of ½ inch.

In the operation of the apparatus, after the lamp assembly has been properly positioned for the sealing operation, the gas flow to burners 37 is turned on simultaneously with energization of the motor 74 to oscillate the burners. When the tube 1 has been sufficiently heated and partially collapsed by the flames 56, the gas supply to the burners and the electric current to the motor are shut off immediately after the jaws 38 are actuated to compress the heated portion of the tube.

What I claim as new and desire to secure by Letters Patent of the United States is:

1. A pinch sealing apparatus comprising, in combination, holder means for supporting a tube of vitreous material with its axis in a predetermined position, a pair of gas burners arranged relative to said holder means to be on opposite sides of said axis and to direct opposed flames toward said axis along a given plane including said axis, means supporting said burners for oscillation in respective paths parallel to each other and normal to the said given plane including said axis, and means to effect oscillation of said burners in mutually opposite directions within their respective paths at rates approximating simple harmonic motion and for substantially equal distances to each side of said given plane, a pair of pinch jaws arranged on opposite sides of said axis adjacent said burners, and means for closing said jaws to engage and pinch the portion of said tube heated by the burners.

2. A pinch sealing apparatus comprising, in combination, holder means for supporting a tube of vitreous material with its axis in a predetermined vertical position, a pair of gas burners arranged relative to said holder means to be on opposite sides of said axis and to direct opposed flames horizontally toward said axis along a given vertical plane including said axis, means supporting said burners for oscillation in respective horizontal paths parallel to each other and normal to the said given vertical plane including said axis, and means to effect oscillation of said burners in mutually opposite directions within their respective paths at rates approximating simple harmonic motion and for substantially equal distances to each side of said given vertical plane, a pair of pinch jaws arranged on opposite sides of said axis adjacent said burners, and means for closing said jaws to engage and pinch the portion of said tube heated by the burners.

3. A pinch sealing apparatus comprising, in combination, holder means for supporting a tube of vitreous material with its axis in a predetermined position, a pair of gas burners arranged relative to said holder means to be on opposite sides of said axis and to direct toward said axis along a given plane including said axis opposed flames having a width approximating and not less than the diameter of the said tube, means supporting said burners for oscillation in respective paths parallel to each other and normal to the said given plane including said axis, and means to effect oscillation of said burners in mutually opposite directions within their respective paths at rates approximating simple harmonic motion and for substantially equal distances to each side of said given plane, the amplitude of oscillation of the burners being approximately equal to the width of the flames issuing therefrom so that at the limits of oscillation each burner the flame therefrom is at one side of said given plane, a pair of pinch jaws arranged on opposite sides of said axis adjacent said burners, and means for closing said jaws to engage and pinch the portion of said tube heated by the burners.

4. A pinch sealing apparatus comprising, in combination, holder means for supporting a tube of vitreous material with its axis in a predetermined vertical position, a pair of gas burners arranged relative to said holder means to be on opposite sides of said axis and to direct opposed flames horizontally toward said axis along a given vertical plane including said axis, a pair of shafts each supporting one of said burners and mounted parallel to each other and normal to the said given vertical plane including said axis, and means for rectilinearly reciprocating said shafts in mutually opposite directions at rates approximating simple harmonic motion to effect oscillation of the respective burners for substantially equal distances to each side of said given vertical plane, a pair of pinch jaws arranged on opposite sides of said axis adjacent said burners, and means for closing said jaws to engage and pinch the portion of said tube heated by the burners.

5. In combination, a pair of gas burners spaced apart and arranged to direct opposed flames toward each other along a given line between the burners, means supporting said burners for oscillation in a common plane and in respective paths parallel to each other and normal to the said given line, and means to effect oscillation of said burners in mutually opposite directions within their respective paths at rates approximating simple harmonic motion and for substantially equal distances to each side of said given line, and means to support tubular glass stock with the axis of the tubular stock normal to the said common plane of oscillation of said burners and centered with respect thereto.

6. In combination, a pair of gas burners spaced apart and arranged to direct opposed flames of approximately equal width toward each other along a given line between the burners, means supporting said burners for oscillation in a common plane and in respective paths parallel to each other and normal to the said given line, and means to effect oscillation of said burners in mutually opposite directions within their respective paths at rates approximating simple harmonic motion and for substantially equal distances to each side of said given line, the amplitude of oscillation of the burners being approximately equal to the width of the flames issuing therefrom so that at the limits of oscillation of each burner the flame therefrom is at one side of the said given line, and means to support tubular glass stock with the axis of the tubular stock normal to the said common plane of oscillation of said burners and centered with respect thereto.

7. In combination, a pair of gas burners spaced apart and arranged to direct opposed flames toward each other along a given line between the burners, a pair of shafts each supporting one of said burners for reciprocal motion in a common plane said shafts being mounted parallel to each other and normal to the said given line, and means for rectilinearly reciprocating said shafts in mutually opposite directions at rates approximating simple harmonic motion to effect oscillation of the respective burners for substantially equal distances to each side of said given line, and means to support tubular glass stock with the axis of the tubular stock normal to the said plane of reciprocal motion of the burners and centered with respect thereto.

References Cited in the file of this patent

UNITED STATES PATENTS

| | | |
|---|---|---|
| 2,334,604 | Bunger | Nov. 16, 1943 |
| 2,427,722 | Greiner | Sept. 23, 1947 |
| 2,530,168 | Knochel | Nov. 14, 1950 |